(12) United States Patent
Datta et al.

(10) Patent No.: US 10,728,134 B2
(45) Date of Patent: Jul. 28, 2020

(54) METHODS, SYSTEMS, AND COMPUTER READABLE MEDIA FOR MEASURING DELIVERY LATENCY IN A FRAME-PREEMPTION-CAPABLE NETWORK

(71) Applicant: Keysight Technologies, Inc., Santa Rosa, CA (US)

(72) Inventors: Pradosh Tapan Datta, Kolkata (IN); Tanuman Bhaduri, Kolkata (IN); Kingshuk Mandal, Kolkata (IN)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 16/191,094

(22) Filed: Nov. 14, 2018

(65) Prior Publication Data
US 2020/0153722 A1 May 14, 2020

(51) Int. Cl.
H04L 12/26 (2006.01)
H04L 12/841 (2013.01)
H04L 12/24 (2006.01)

(52) U.S. Cl.
CPC ......... *H04L 43/106* (2013.01); *H04L 41/145* (2013.01); *H04L 43/0858* (2013.01); *H04L 47/283* (2013.01)

(58) Field of Classification Search
None
See application file for complete search history.

(56) References Cited

U.S. PATENT DOCUMENTS 6,111,673 A * 8/2000 Chang ............... H04Q 11/0066
398/79
7,489,706 B2 2/2009 Hatley et al.
(Continued)

OTHER PUBLICATIONS

Sirient: "Time-Sensitive Networking (TSN) Playbook: Test Cases and Methodologies" Submitted in the IDS by the Applicant (Year: 2016).*

(Continued)

*Primary Examiner* — Jamaal Henson (57) ABSTRACT

Methods, systems, and computer readable media for measuring preempted frame delivery latency in a frame-preemption-capable network are disclosed. One method includes, in a network test tool including at least one processor, simulating frame preemption by generating a plurality of simulated preempted frame fragments of a simulated preempted frame and an express frame. The method further includes inserting a last fragment generation timestamp in a last fragment of the simulated preempted frame fragments, wherein inserting the last fragment generation timestamp in a last fragment of the simulated preempted frame fragments includes inserting the last fragment generation timestamp in a portion of the last fragment that will remain in a last fragment of a refragmentation of the simulated preempted frame in the event that the simulated preempted frame is reassembled and refragmented. The method further includes transmitting the simulated preempted frame fragments and the express frame to a device under test (DUT). The method further includes receiving frame fragments including a frame or frame fragment including the last fragment generation timestamp. The method further includes calculating, using the last fragment generation timestamp, delivery latency of the simulated preempted frame generated by the test tool.

20 Claims, 9 Drawing Sheets

(56) References Cited

U.S. PATENT DOCUMENTS

| | | | | |
|---|---|---|---|---|
| 7,631,096 | B1* | 12/2009 | Yeh | H04L 12/413 370/231 |
| 7,961,637 | B2 | 6/2011 | McBeath | |
| 8,730,826 | B2 | 5/2014 | Regev | |
| 8,811,410 | B1 | 8/2014 | Jain et al. | |
| 8,929,240 | B2 | 1/2015 | Huang et al. | |
| 9,660,927 | B2 | 5/2017 | Akl-Chedid et al. | |
| 10,425,321 | B2* | 9/2019 | Joseph | H04J 3/0667 |
| 2002/0031086 | A1* | 3/2002 | Welin | H04L 47/10 370/229 |
| 2008/0298261 | A1* | 12/2008 | Rittmeyer | H04L 43/50 370/250 |
| 2009/0010158 | A1* | 1/2009 | Filsfils | H04L 65/608 370/231 |
| 2012/0131309 | A1* | 5/2012 | Johnson | G06F 15/80 712/41 |
| 2015/0281028 | A1 | 10/2015 | Akhter et al. | |

OTHER PUBLICATIONS

Sirient: "Time-Sensitive Networking (TSN) Playbook: Test Cases and Methodologies" Submitted in the IDS by the Applicant (Year: 2016 (Year: 2016).*

Commonly-assigned, Co-pending U.S. Appl. No. 16/177,019 for "Methods, Systems, And Computer Readable Media For Testing Effects Of Simulated Frame Preemption And Deterministic Fragmentation Of Preemptable Frames In A Frame-Preemption-Capable Network," (Unpublished, filed Oct. 31, 2018).

"Spirent TTsuite-TSN-Preemption 1.0.0," Release Notes, Spirent, pp. 1-2 (Sep. 7, 2018).

"Spirent TTsuite-TSN-Preemption," Data Sheet, Rev A, Spirent, pp. 1-2 (Sep. 2018).

"Time-Sensitive Networking (TSN) Playbook," Test Cases & Methodologies, Rev D, Spirent, pp. 1-76 (Aug. 2018).

"Preemption standard enables high priority frames and traffic," The Industrial Ethernet Book, Issue 97 / 7, http://www.iebmedia.com/index.php?id=11934&parentid=63&themeid=255&hft=97&showdetail=true&bb=1, pp. 1-3 (May 10, 2018).

"Spirent TestCenter Software and Hardware New Features 4.83," Spirent Communications, pp. 1-17 (Feb. 2018).

"MAC Merge Frame Preemption for Interspersing Express Traffic Conformance Test Plan," Version 0.2 Technical Document, Ethernet Testing Services, IEEE 802.3 MAC Merger Sublayer Test Suite v0.2, pp. 1-84 (May 22, 2017).

Zhou et al., "Analysis and Implementation of Packet Preemption for Time Sensitive Networks," IEEE, pp. 1-6 (2017).

"Joint Tutorial," IEEE 802.1 / IEEE 802.3 Tutorial #2, Version 0.2 rev1 , pp. 1-61 (Mar. 2015).

* cited by examiner

METHODS, SYSTEMS, AND COMPUTER READABLE MEDIA FOR MEASURING DELIVERY LATENCY IN A FRAME-PREEMPTION-CAPABLE NETWORK

TECHNICAL FIELD

The subject matter described herein relates to testing network devices. More particularly, the subject matter described herein relates to methods, systems, and computer readable media for delivery latency in a frame-preemption-capable network.

BACKGROUND

Ethernet has become the de-facto data networking technology. It has been tested over time and has gained dominance in data communications. Currently, Ethernet is being extended to industrial networks where robots, machines, and sensors communicate among themselves to take action collectively. To be suitable for industrial networks, Ethernet needs to overcome some of its weaknesses. One weakness of conventional Ethernet protocol is head-of-line blocking. Head-of-line blocking occurs when Ethernet frames associated with different traffic flows share an egress queue. In one example, a large frame of non-real-time traffic, such as a file download, can delay transmission of frames of time-critical traffic located behind the large frame in the output queue. Delaying transmission of time critical traffic, such as voice or video traffic, can result in poor quality of service for end users.

To avoid some of the difficulties associated with conventional Ethernet, time sensitive networking or TSN standards have been defined. Time sensitive networking is a set of standards developed by the Institute of Electrical and Electronics Engineers (IEEE). Specifically, time sensitive networking standards are being developed by the time sensitive networking task group of the IEEE 802.1 working group. The TSN task group was formed in November of 2012 by renaming the existing audio/video bridging task group. As part of the TSN standard, Ethernet frames can be preempted and fragmented. For example, a low priority frame of non-real-time traffic that may block or delay transmissions of higher priority real-time traffic can be preempted by the real time traffic and transmitted in fragments to the destination. By "preempted", it is meant that even after the low-priority frame has started its transmission onto the wire to the next hop, the transmission is stopped after some, but not all, of the frame has been transmitted. The higher priority real-time frames are then transmitted. The portion of the frame that has already been transmitted forms the initial fragment, and the remainder of the frame forms continuation fragments Frame preemption represents a significant shift from conventional Ethernet where a packet is transmitted in its entirety to the next hop once transmission is started and travels as a whole, rather than in fragments. When frames are preempted and fragmented, the impact of preemption and fragmentation needs to be measured. It is desirable that a network test tool be capable of measuring different aspects associated with delivery of preempted frames by the network.

Accordingly, there exists a need for methods, systems, and computer readable media for measuring delivery latency in a frame-preemption-capable network.

SUMMARY

Methods, systems, and computer readable media for measuring preempted frame delivery latency in a frame-preemption-capable network are disclosed. One method includes, in a network test tool including at least one processor, simulating frame preemption by generating a plurality of simulated preempted frame fragments of a simulated preempted frame and an express frame. The method further includes inserting a last fragment generation timestamp in a last fragment of the simulated preempted frame fragments. The method further includes transmitting the simulated preempted frame fragments and the express frame to a device under test (DUT), wherein inserting the last fragment generation timestamp in a last fragment of the simulated preempted frame fragments includes inserting the last fragment generation timestamp in a portion of the last fragment that will remain in a last fragment of a refragmentation of the simulated preempted frame in the event that the simulated preempted frame is reassembled and refragmented. The method further includes receiving frame fragments including a frame or frame fragment including the last fragment generation timestamp. The method further includes calculating, using the last fragment generation timestamp, delivery latency of the simulated preempted frame generated by the test tool.

According to an aspect of the subject matter described herein, generating the simulated preempted frame fragments includes generating merge sublayer packets (mPackets).

According to an aspect of the subject matter described herein, generating a plurality of simulated preempted frame fragments includes generating fragments of at least one simulated preempted frame, wherein the fragments include an initial fragment and one or more continuation fragments.

According to an aspect of the subject matter described herein, inserting the last fragment generation timestamp in the last fragment of the simulated frame fragments includes inserting the last fragment generation timestamp in a last 64 bytes of the last fragment.

According to an aspect of the subject matter described herein, the DUT reassembles the simulated preempted frame fragments into a reassembled frame and fragments the reassembled frame.

According to an aspect of the subject matter described herein, receiving a frame fragment including the last fragment generation timestamp includes receiving the last fragment generation timestamp in a fragment of the reassembled frame.

According to an aspect of the subject matter described herein, receiving a frame or fragment including the last fragment generation timestamp includes receiving the last fragment generation timestamp in a reassembled frame received from the DUT.

According to an aspect of the subject matter described herein, calculating the delivery latency of the simulated preempted frame includes computing the delivery latency by subtracting the last fragment generation timestamp from a time of receipt of the frame or fragment including the last fragment generation timestamp.

According to an aspect of the subject matter described herein, calculating delivery latency for a plurality of different simulated preempted frames and outputting an indication of jitter in delivery latency of the simulated preempted frames based on the calculated latencies.

A system for measuring preempted frame delivery latency in a frame-preemption-capable network. A network test tool includes at least one processor. A frame preemption and fragmentation simulator simulates frame preemption by generating a plurality of simulated preempted frame fragments of a simulated preempted frame and an express frame and inserts a last fragment generation timestamp in a last fragment of the simulated preempted frame fragments, where inserting the last fragment generation timestamp in a last fragment of the simulated preempted frame fragments includes inserting the last fragment generation timestamp in a portion of the last fragment that will remain in a last fragment of a refragmentation of the simulated preempted frame in the event that the simulated preempted frame is reassembled and refragmented. The frame preemption and fragmentation simulator transmits the simulated preempted frame fragments and the express frame to a device under test (DUT). A preempted frame delivery latency calculator receives a frame or frame fragment including the last fragment generation timestamp and calculates, using the last fragment generation timestamp, delivery latency of the simulated preempted frame generated by the test tool.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings, of which.

DETAILED DESCRIPTION

Conventional Ethernet provides best effort delivery service, i.e., a frame originated from an ingress node reaches its destination in a best effort manner. In best effort delivery service, a frame may reach the destination on time, the frame may be delayed, or the frame may not reach the destination at all. The reason for this unpredictability is that the outgoing queue of a switch might be full when a new frame arrives. As a result, additional incoming frames may be queued, dropped, or delayed.

An outgoing port of an Ethernet switch can transmit only one frame at a time. If the currently transmitting frame is long (for example, a flow for a file back-up), urgent frames (for example, frames carrying instructions for a robot) will queue up behind the long frame. If the queue gets full, then the urgent frames will be dropped. This is shown in FIG. 1.

Figure 1:
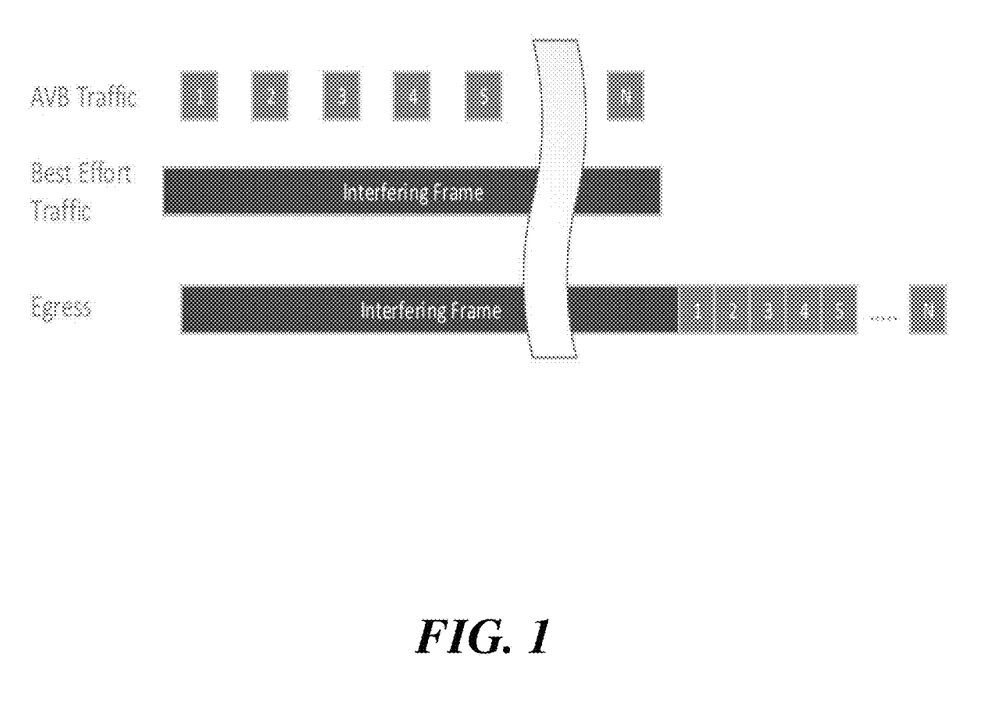
FIG. 1 is a block diagram illustrating interference among frames in a conventional Ethernet network.

Referring to FIG. 1, the topmost row illustrates frames 1-N of audio-video bridging (AVB) traffic. AVB traffic carries streaming audio and video data, which must be delivered with precise timing without interference or delay caused by other traffic. For example, audio data and video data may be transmitted in separate streams. In some applications, the audio and video data must be synchronized. If transmission of either the audio or video data is delayed, the streams may be out of sync at the receiver, which is undesirable.

The second row in FIG. 1 illustrates an interfering frame. The interfering frame may be a large frame of non-real-time data, such as a file backup. If the interfering frame and the AVB frames share the same output port (i.e. egress port) in a network switch, the interfering frame will prevent on-time transmission of the AVB frames. This interference is illustrated by the third row in FIG. 1. In the third row of FIG. 1, the interfering frame delays transmission of the AVB frames at the egress of the network switch, which can result in undesirable effects, such as video being delayed or out of sync with audio in AVB networks.

To overcome this problem, Ethernet fragmentation or frame preemption is a new technology introduced by IEEE TSN standards. In a frame-preemption-capable switch, transmission of a non-urgent frame can be stopped during its transmission. The urgent frames will be transmitted, and then the remainder of the non-urgent frame will resume transmission. Stopping a frame during transmission is not possible in traditional Ethernet.

Figure 2:
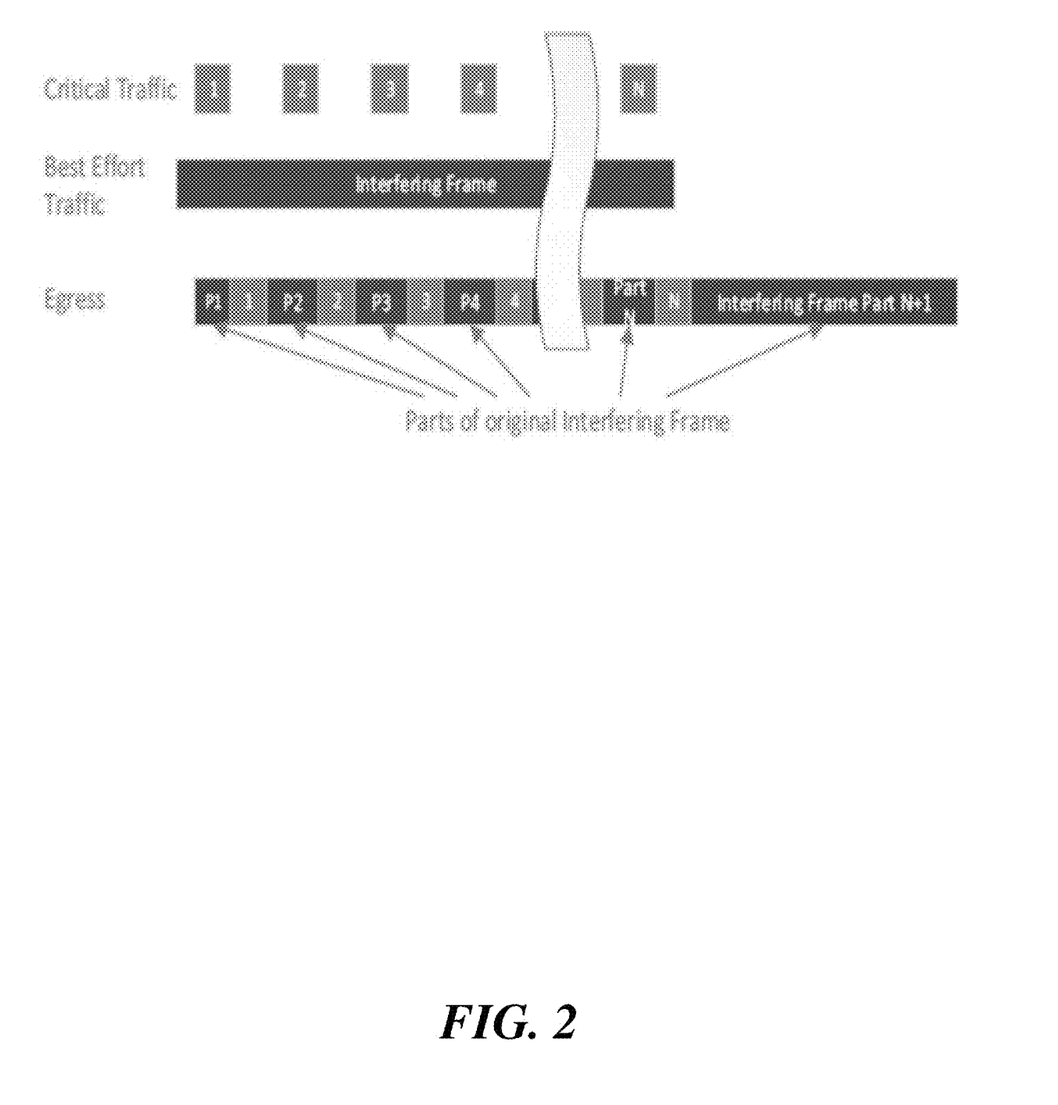
FIG. 2 is a block diagram illustrating frame preemption and fragmentation in a frame-preemption-capable network.

When frame preemption is implemented, the wire or transmission medium will see fragmented Ethernet frames intermixed with urgent or express frames as shown in FIG. 2. In FIG. 2, the topmost row illustrates critical traffic, such as AVB traffic, that must be delivered on time. In the parlance of time sensitive networks, the critical traffic is referred to as express frames. The second row in FIG. 2 illustrates an interfering frame of non-time-critical traffic. The third row in FIG. 2 illustrates fragmentation of the interfering frame and the intermixing of the fragments of the interfering frame with frames of the critical traffic that preempt transmission of the interfering frame. In FIG. 2, fragment P1 is the first fragment of the interfering frame and is followed by critical frame number 1. Next, fragment P2 occurs, which is followed by critical or express frame number 2, and so forth. Once all of the critical frames are transmitted, the remainder of the interfering frame will be transmitted.

Figure 3:
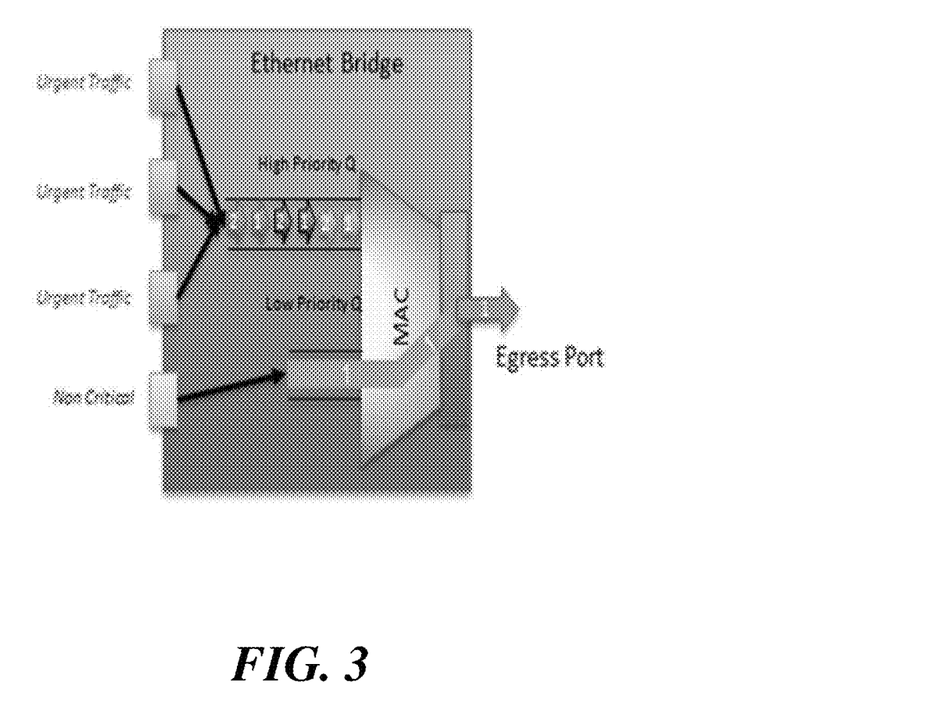
FIG. 3 is a schematic diagram illustrating the blocking of express packets in an Ethernet bridge in a conventional Ethernet network.

FIG. 3 illustrates another example of frame preemption by an Ethernet Bridge. An outgoing port of an Ethernet switch can transmit only one packet at a time. If the currently transmitting packet is long (e.g., a packet for file back-up), at that point many urgent packets (e.g., a network packet carrying instructions for a robot) will queue up behind the long packet. If the queue is full, packets arriving at the queue when it is full may be discarded or delayed. This is shown in FIG. 3. In FIG. 3, the large packet labeled non-critical blocks transmission of other urgent packets or express packets. Express packets arriving at the egress port while the large packet is transmitting are blocked, and, at a minimum, delayed.

Figure 4:
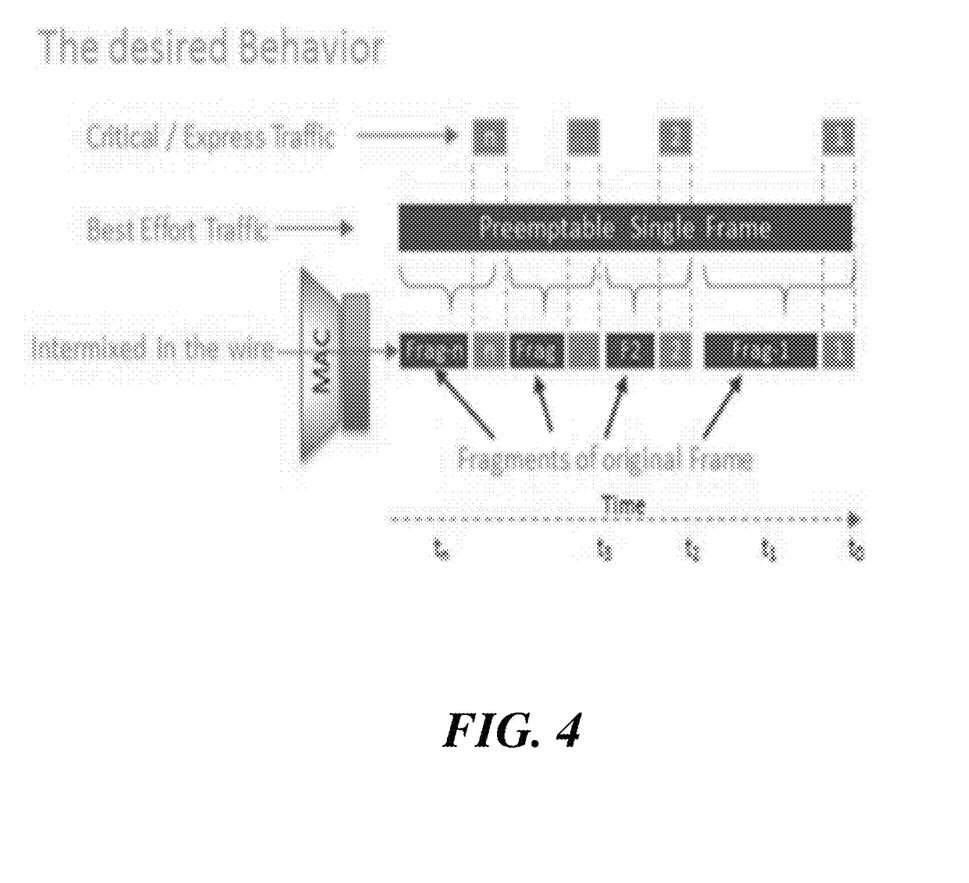
FIG. 4 is a diagram illustrating frame preemption and fragmentation in a frame-preemption-capable network

As stated above with respect to FIG. 2, when frame preemption is implemented, the wire or transmission medium will see fragmented Ethernet frames intermixed with urgent or express frames, as shown in FIG. 4. In FIG. 4, fragments of the preemptable frame are intermixed with express frames and transmitted at different times. It is desirable to measure network performance in a frame-preemption capable network. One measurement that may be desired is latency in delivery of fragmented frames.

One notable aspect of frame preemption is that frame preemption and fragmentation occur in a hop by hop manner. One consequence of hop by hop fragmentation is that the same fragments do not travel from source to destination because the frames travel through multiple hops or multiple switches. Once the fragments reach the first transit switch, the first switch will reassemble the received fragments on its receive/ingress port and will reassemble the fragments before transmitting the frame to the egress port. While forwarding the frame to the next switch, the current switch may refragment the frame based on the queuing status at the egress port of the switch.

For a test tool, if the traffic generation port breaks a packet (of length L) into N fragments and transmits the N fragments to a fragmentation-capable device under test, the number of packets that the receive side of the test tool will receive is unpredictable. The test tool may receive a single reassembled frame of length L. The test tool can also receive N+/−x number of fragments, depending on fragmentation by device under test. The length of each of the fragments is also unpredictable. This is explained with respect to FIG. 5.

Figure 5:
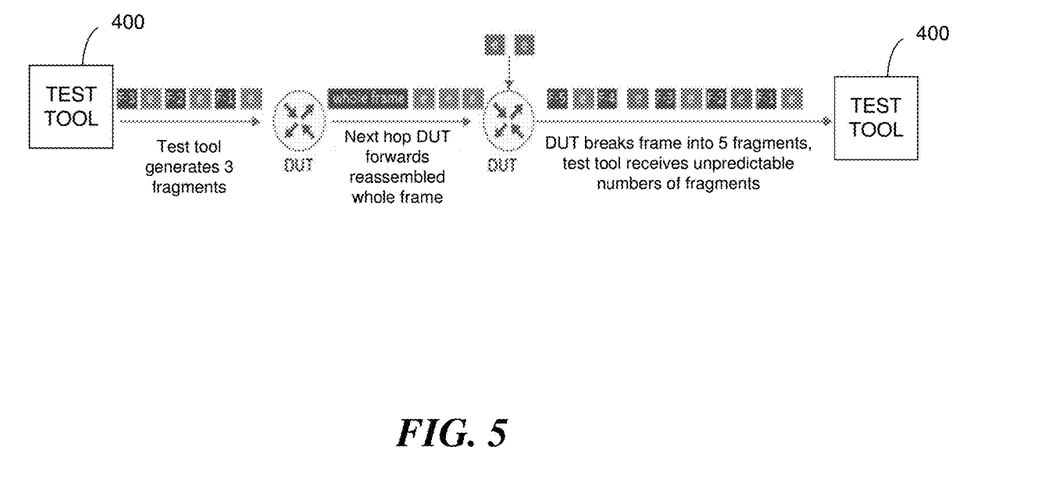
FIG. 5 is a block diagram illustrating a test setup involving a test tool for measuring delivery latency in a frame preemption capable network.

In FIG. 5, a test tool 400 sends three express frames labeled e and three frame fragments labeled F-1, F-2, and F-3 to a first device under test. The first device under test reassembles the frame fragments into a whole frame and sends the whole frame without fragmentation and the three express frames to a second device under test. The second device under test receives the whole frame, the three express frames, and two additional express frames. The second device under test reassembles the whole frame, refragments the whole frame into five fragments labeled F1-F5, and transmits the fragments intermixed with the express frames to test tool 400. Test tool 400 receives the frame fragments and the express frames and calculates effective throughput for the preemptable frames. The mechanism for calculating delivery latency in delivery of the preemptable frames will now be described.

New methods and metrics are needed for effectively testing and measuring the efficiency of the frame-preemption-capable network. Latency, jitter and other travel time measurement techniques for conventional Ethernets (where an Ethernet frame is never broken into fragments) fall short.

The system described herein includes new methodologies and mechanisms to solve these measurement problems for TSN.

When an Ethernet frame is fragmented then the question becomes, "how do we measure the latency or travel time of the fragmented frame?" The traditional method of latency measurement will work for the express frames (the frames which are guaranteed never to be fragmented) but the same will not work for fragmented frames. Secondly when a frame is fragmented and transmitted intermixed with express frames, then fragmented frames receive less bandwidth than will be given to the express frames. As a result, latency and jitter for fragmented frames will increase. Since the frame is fragmented, receiving one fragment cannot indicate when the rest of the fragments are going to arrive. To calculate the latency for the whole frame, test tool 400 must account for the unpredictable number of fragments that may be received.

To measure latency of fragmented frame, from the sending side (ingress port), test tool 400 inserts a sending timestamp in the last fragment it generates. This timestamp is referred to herein as the last fragment generation timestamp and is inserted in the last 64 bytes of the last fragment of a given simulated preempted frame generated by test tool 400. This last fragment generation timestamp is represented by $TG_{lf}$ in FIG. 6. If test tool 400 inserts the last fragment generation timestamp in the last fragment of a frame, even if the intermediate DUT first reassembles all of the test-tool-generated fragments and subsequently refragments the frame in an entirely different manner before sending the frame to the next switch, the last fragment generation timestamp (as assigned by test tool 400) will still be carried in the last fragment of the newly created fragments. This will happen because IEEE standards indicate that the minimum last fragment size must be 64 bytes or greater.

Figure 6:
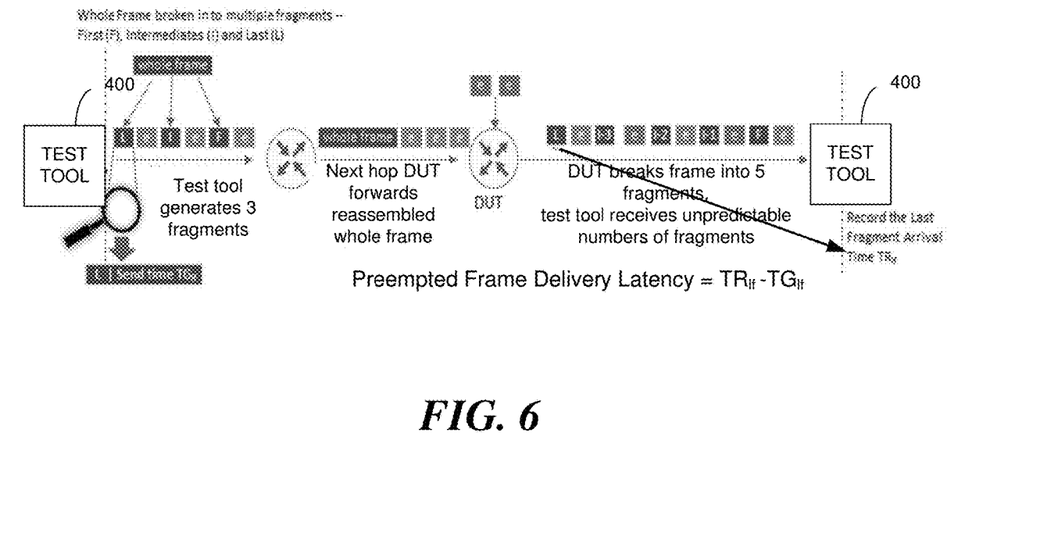
FIG. 6 is a block diagram illustrating a test tool and a mechanism for measuring delivery latency in a frame-preemption-capable network.

On the receive side when test tool 400 receives the last fragment, test tool 400 records the time of receipt of the last fragment. The time of receipt of the last fragment of a given simulated preempted frame is referred to herein as the last fragment received timestamp. This receive timestamp is represented as $TR_{lf}$ in FIG. 6. Then test tool 400 can perform the following calculation to calculate the packet delivery latency of a preempted frame in a frame-preemption-capable network.

$$\text{Preempted Frame Delivery Latency} = TR_{lf} - TG_{lf}$$

Figure 7:
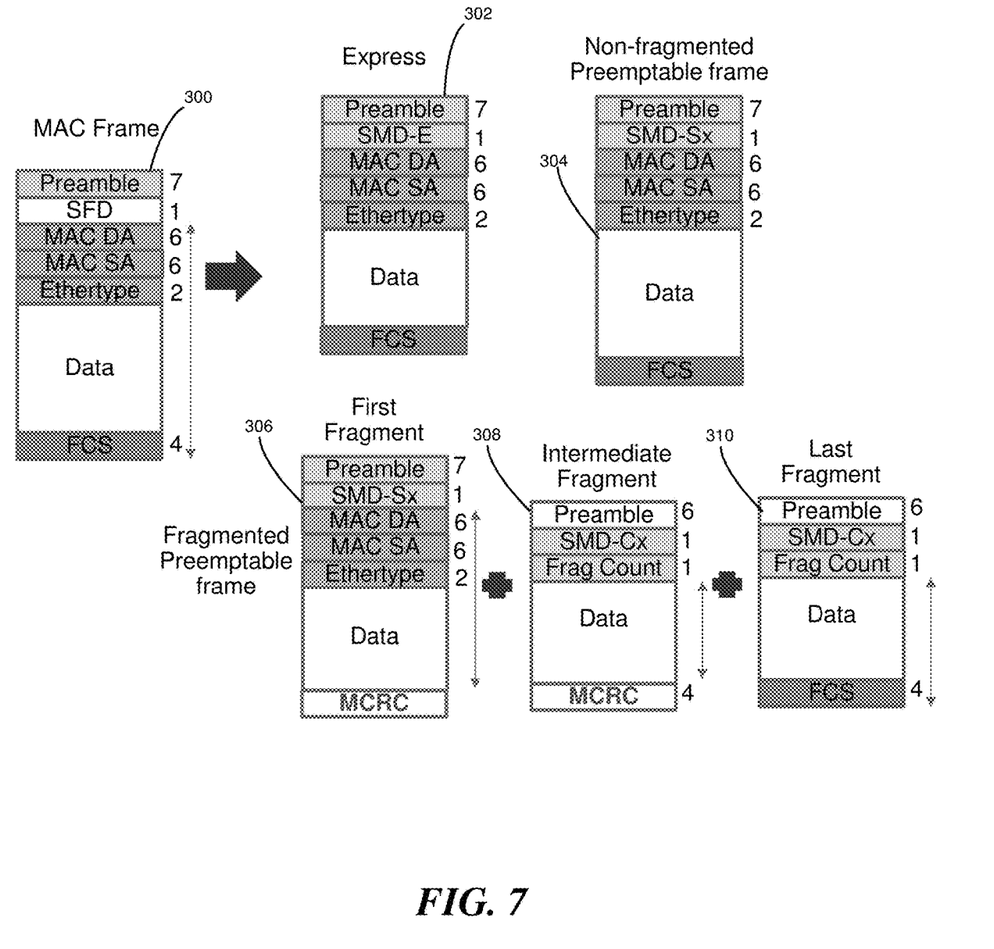
FIG. 7 is a diagram illustrating examples of merge packets (mPackets) that may be generated by a test tool for testing the effects of frame preemption and fragmentation in a frame-preemption-capable network.

Test tool 400 as described herein may be capable of generating individual frame fragments of different types, such as initial mPackets (start of mPacket delimiter (SMD)-S0), continuation mPackets (SMD-S1, SMD-S2, etc.) In frame-preemption-capable networks, the medium access control (MAC) merge sublayer controls frame preemption and packet fragmentation. A test tool as described herein simulates the merge sublayer by generating packet fragments of a preemptable frame and interspersing the packet fragments with express frames. Frames generated by the merge sublayer are referred to as mPackets. FIG. 7 illustrates mPacket formats that may be generated by the test tool described herein. In FIG. 7, frame 300 is an unfragmented MAC frame. Unfragmented MAC frame 300 includes a preamble, MAC source address, MAC destination address, Ethertype, and frame check sequence (FCS). Frame 302 is express frame that is to be transmitted with high priority. The express frame includes a preamble, an SMD code that identifies the frame as express frame, a MAC source address, a MAC destination address, an Ethertype, data, and frame check sequence. A non-fragmented preemptable frame 304 includes a preamble, an SMD code that is used (along with frame check sequence) to identifies it as a preemptable frame, a MAC source address, a MAC destination address, an Ethertype, data, and a frame check sequence.

Test tool 400 as described herein may generate initial fragments and intermediate or continuation fragments of preemptable frames. In FIG. 7, fragment 306 is an example of an initial fragment that may be generated by the test tool described herein. Initial fragment 306 includes a preamble, and SMD code identifying the fragment as an initial fragment, a MAC destination address, a MAC source address, an Ethertype, data, and a merge sublayer packet cyclic redundancy check (mCRC) code. Intermediate or continuation fragment 308 includes a preamble, an SMD code identifying the fragment as a continuation fragment, a fragment count, data, and an mCRC code. There may be multiple intermediate fragments generated, depending on the size of the unfragmented frame. The last continuation fragment 310 includes a preamble, an SMD code, a fragmentation count, data, and a frame check sequence instead of an mCRC code. In addition, test tool 400 as described herein may insert a last fragment timestamp in the last 64 bytes of the last continuation fragment of a given fragmented frame.

Test tool 400 as described herein is capable of generating express frames, such as the express frame 302, and intermixing the express frames with mPacket frames, such as mPacket frames 306, 308, and 310. Test tool 400 may perform the deterministic ordering of the mPackets and the express frame so that tests can be repeated and results can be measured. Flexibility in configuration of test tool 400 allows simulation of real time network errors.

The mPackets generated by test tool 400 described herein may have SMD codes. Tables 1 and 2 shown below illustrate SMD codes and fragmentation codes that test tool 400 may insert in simulated M-packets.

TABLE 1

SMD Codes

| MPacket type | Frame # | SMD |
| --- | --- | --- |
| SFD (express) | NA | 0xD5 |
| SMD-Sx | 0 | 0xE6 |
| Premptable | 1 | 0x4C |
| frame start | 2 | 0x7F |
| | 3 | 0xB3 |
| SMD-Cx | 0 | 0x61 |
| Non-initial | 1 | 0x52 |
| fragment | 2 | 0x9E |
| | 3 | 0xAD |
| Verify | | 0x07 |
| Respond | | 0x19 |

TABLE 2

Fragmentation Codes

| Frag Count | Frag |
| --- | --- |
| 0 | 0xE6 |
| 1 | 0x4C |
| 2 | 0x7F |
| 3 | 0xB3 |

In a frame-preemption-capable network the original frame can be delivered in smaller fragments and each fragment can have a different length from other fragments and can be delivered at a different time. In order to achieve predictability of preempted fragments the test tool described herein may allow deterministic configuration and ordering of preempted frame fragments. In addition, test tool 400 as described herein can provide for measurement of delivery latency for simulated preempted frames.

Figure 8:
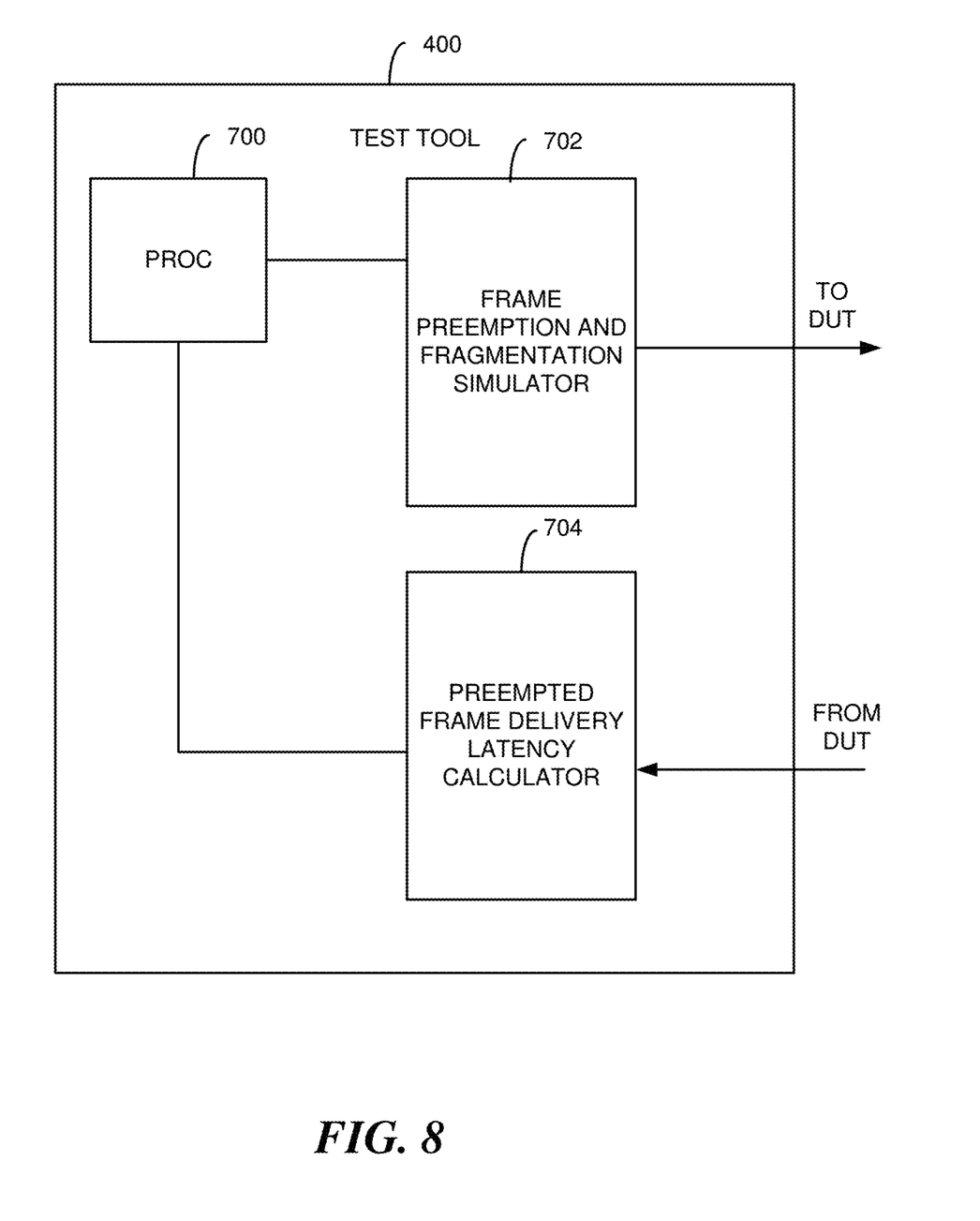
FIG. 8 is a block diagram of a test tool for measuring delivery latency in a frame-preemption-capable network.

FIG. 8 is a block diagram of a test tool according to the subject matter described herein. Referring to FIG. 8, test tool 400 includes at least one processor 700 that controls the overall operation of test tool 400. A frame preemption and fragmentation simulator 702 simulates frame preemption by generating frame fragments and express frames and generates and inserts the last fragment generation timestamp in the last fragment of each preempted frame before transmission to the device under test. Inserting the last fragment generation timestamp in a last fragment of the simulated preempted frame fragments may include inserting the last fragment generation timestamp in a portion of the last fragment that will remain in a last fragment of a refragmentation of the simulated preempted frame in the event that the simulated preempted frame is reassembled and refragmented. A simulated preempted frame may be reassembled and refragmented multiple times by frame-preemption-capable switches between the transmit port of test tool 400 from which the initial frame fragments are transmitted and the receive port of test tool 400 that receives the frame or frame fragment that includes the last fragment generation timestamp. Because the last fragment generation timestamp is inserted in a portion of the last fragment that will remain in a last fragment of any refragmentation of the simulated preempted frame, test tool 400 can accurately measure end to end delivery latency of the simulated preempted frame, even in the presence of multiple reassemblies and refragmentations of the initial frame.

A preempted frame delivery latency calculator 704 receives whole frames, frame fragments, and express frames output from a DUT 402 and calculates the delivery latency of preempted frames using the last fragment generation timestamp received for each preempted frame. For example, preempted frame delivery latency calculator 704 may receive frame fragments output from DUT 402 where the last fragment for a given frame fragmented by DUT 402 includes the last fragment generation timestamp inserted by frame preemption and fragmentation simulator 702. Preempted frame delivery latency calculator 704 may measure the delivery latency of the fragmented frame transmitted by test tool 400 by calculating the difference between the time of receipt of the fragment containing the last fragment generation timestamp and the last fragment generation timestamp. Preempted frame delivery latency calculator 704 may calculate latency in this manner for a plurality of simulated preempted frames generated by test tool 400 and then calculate jitter from the latency measurements across the simulated frames. For example, preempted frame delivery latency calculator 704 may calculate an average and a standard deviation of the latency of the simulated preempted frames and output the standard deviation as an indication of the jitter in delivery time of the simulated preempted frames. In another example, preempted frame delivery latency calculator 704 may output individual measurements of latency of the simulated preempted frames as an indication of the jitter.

Figure 9:
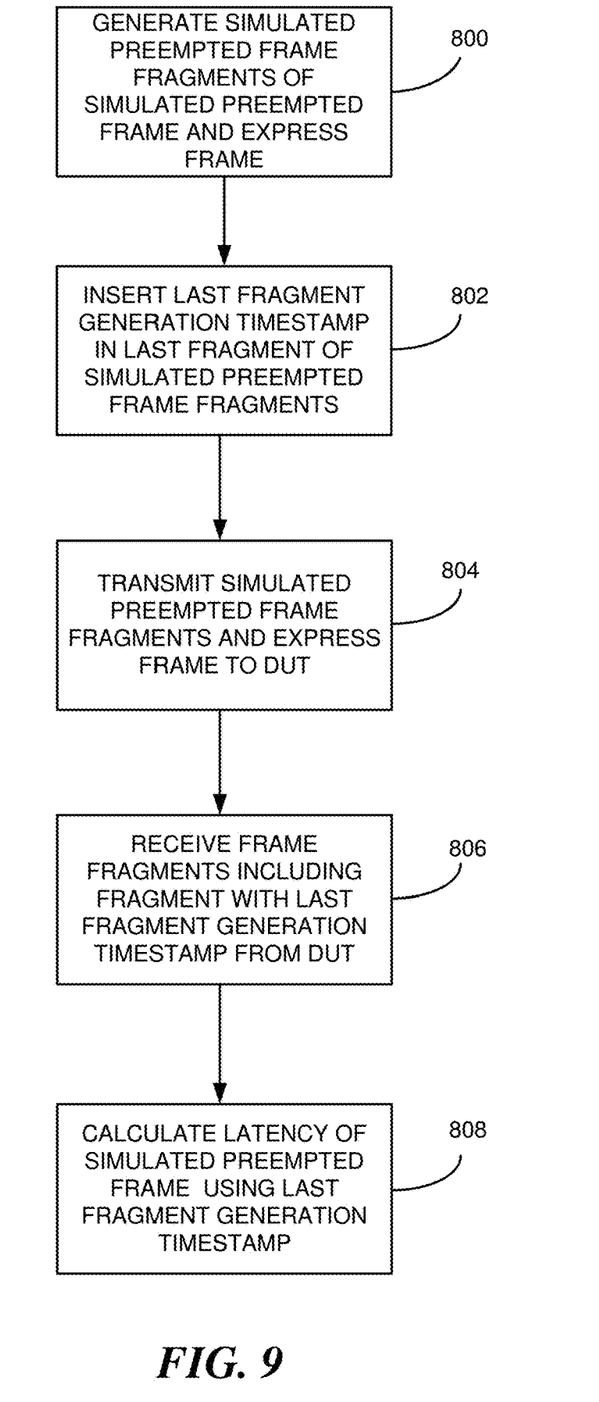
FIG. 9 is a flow chart of a process for testing a device under test and measuring delivery latency in a frame-preemption-capable network.

FIG. 9 is a flow chart illustrating an exemplary process for measuring preempted frame delivery latency in a frame-preemption-capable network. Referring to FIG. 9, in step 800 frame preemption is simulated by generating a plurality of simulated preempted frame fragments and an express frame. For example, frame preemption and fragmentation simulator 702 may generate M-packets as illustrated in FIG.

7. The M-packets may be simulated fragments of a preempted frame. Frame preemption and fragmentation simulator 702 may also generate express frames, such as simulated AVB frames.

In step 802, the method includes inserting a last fragment generation timestamp in a last fragment of the simulated preempted frame fragments. For example, frame preemption and fragmentation simulator 702 may generate frame fragments and generate and insert a timestamp in a portion of the last fragment that will remain in a last fragment of a refragmentation of the simulated preempted frame in the event that the simulated preempted frame is reassembled and refragmented. In one example, the timestamp is inserted in the last 64 bytes of the last fragment of the simulated preempted frame.

In step 804, the simulated preempted frame fragments and express frame are transmitted to the DUT. For example, frame preemption and fragmentation simulator 702 may intermix and transmit the preempted frame fragments and the express frame to the device under test. The device under test may reassemble the simulated preempted frame and then fragment the reassembled frame. The fragmentation by the DUT may be different from the initial fragmentation. However, because the last fragment generation timestamp is inserted in the last 64 bytes of the original last fragment and the minimum fragment size is 64 bytes, the last fragment generation timestamp is guaranteed to be in the last fragment of any refragmentation of the initial simulated preempted frame.

In step 806, test tool 400 receives frame fragments, including a frame or frame fragment with the last fragment generation timestamp, from the device under test. For example, test tool 400 may receive a frame fragment generated by the device under test that includes the last fragment generation timestamp. In another example, if the device under test reassembles the fragments of the preempted frame transmitted by the test tool and does not fragment the reassembled frame, test tool 400 may receive the last fragment generation timestamp in the reassembled frame. This would occur if the test tool were placed after the first DUT on the left hand side in FIG. 5 or FIG. 6.

In step 808, test tool 400 calculates the latency of the simulated preempted frame using the last frame fragmentation timestamp. For example, test tool 400 may record the time of receipt of the frame or frame fragment with the last fragment generation timestamp. Test tool 400 may then calculate delivery latency of the simulated preempted frame by subtracting the last fragment generation timestamp from the time of receipt of the frame or frame fragment that includes the last frame generation timestamp.

The following advantages may be achieved using test tool 400 and preempted frame delivery latency calculation method described herein:

Inserting the fragment generation timestamp only in the last fragment makes this method immutable to re-fragmentation by the DUT. Even if the DUT re-fragments the frame entirely different way, test tool 400 is guaranteed to receive the last fragment generation timestamp carried in the last fragment only. Re-fragmentation will not able to change this behavior.

The algorithm will work without making any assumption on how many fragments the test tool may receive on the egress side or receive side.

Measuring transmit latency using the timestamp in the last fragment optimizes processing on the receive side of the test tool, because there is no need to parse all the intermediate fragments to get the last fragment generation timestamp.

In addition, when measuring latency, there is no need for the test tool to reassemble all of the fragments to extract the timestamp. Instead, the test tool can identify the last fragment in a frame based on the presence of the last fragment generation timestamp.

There is no need to store the receive timestamp for the first and intermediate fragments to calculate the delivery latency. Allowing test tool 400 to measure effective delivery latency without storing timestamps for initial and intermediate frame fragments optimizes memory utilization at test tool 400.

Inserting a fragment generation timestamp in the last 64 bytes of the last fragment of a preempted frame makes this method immune to refragmentation while the packet traverses the TSN network. Performing latency calculations from the last frame fragment only increases processing efficiency at test tool 400.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for measuring preempted frame delivery latency in a frame-preemption-capable network, the method comprising:

in a network test tool including at least one processor:
simulating frame preemption by generating a plurality of simulated preempted frame fragments of a simulated preempted frame and an express frame;
inserting a last fragment generation timestamp in a last fragment of the simulated preempted frame fragments, wherein inserting the last fragment generation timestamp in a last fragment of the simulated preempted frame fragments includes inserting the last fragment generation timestamp in a portion of the last fragment that will remain in a last fragment of a refragmentation of the simulated preempted frame in the event that the simulated preempted frame is reassembled and refragmented;
transmitting the simulated preempted frame fragments and the express frame to a device under test (DUT) and wherein the DUT generates a frame or frame fragments based on the simulated preempted frame fragments;
receiving the frame or frame fragments generated by the DUT, wherein the frame or one of the frame fragments generated by the DUT includes the last fragment generation timestamp; and
calculating, using the last fragment generation timestamp, delivery latency of the simulated preempted frame generated by the test tool.

2. The method of claim 1 wherein generating the simulated preempted frame fragments includes generating merge sublayer packets (m Packets).

3. The method of claim 1 wherein generating a plurality of simulated preempted frame fragments includes generating fragments of at least one simulated preempted frame, wherein the fragments include an initial fragment and one or more continuation fragments.

4. The method of claim 1 wherein inserting the last fragment generation timestamp in the last fragment of the simulated frame fragments includes inserting the last fragment generation timestamp in a last 64 bytes of the last fragment.

5. The method of claim 4 wherein the DUT reassembles the simulated preempted frame fragments into a reassembled frame and fragments the reassembled frame and wherein receiving the frame or frame fragments generated by the DUT includes receiving the fragments of the reassembled frame.

6. The method of claim 5 wherein the last fragment generation timestamp is received in a last fragment of the reassembled frame.

7. The method of claim 1 wherein receiving the frame or frame fragments generated by the DUT includes receiving a reassembled frame from the DUT and wherein the last fragment generation timestamp is received in the reassembled frame.

8. The method of claim 1 wherein calculating the delivery latency of the simulated preempted frame includes computing the delivery latency by subtracting the last fragment generation timestamp from a time of receipt of the frame or fragment including the last fragment generation timestamp.

9. The method of claim 1 comprising calculating delivery latency for a plurality of different simulated preempted frames and outputting an indication of jitter in delivery latency of the simulated preempted frames based on the calculated latencies.

10. A system for measuring preempted frame delivery latency in a frame-preemption-capable network, the system comprising:
 a network test tool including at least one processor;
 a frame preemption and fragmentation simulator for simulating frame preemption by generating a plurality of simulated preempted frame fragments of a simulated preempted frame and an express frame and inserting a last fragment generation timestamp in a last fragment of the simulated preempted frame fragments, and transmitting the simulated preempted frame fragments and the express frame to a device under test (DUT), wherein inserting the last fragment generation timestamp in a last fragment of the simulated preempted frame fragments includes inserting the last fragment generation timestamp in a portion of the last fragment that will remain in a last fragment of a refragmentation of the simulated preempted frame in the event that the simulated preempted frame is reassembled and refragmented and wherein the DUT generates a frame or frame fragments based on the simulated preempted frame fragments; and
 a preempted frame delivery latency calculator for receiving the frame or frame fragments generated by the DUT, wherein the frame or one of the frame fragments generated by the DUT includes the last fragment generation timestamp and calculating, using the last fragment generation timestamp, delivery latency of the simulated preempted frame generated by the test tool.

11. The system of claim 10 wherein generating the simulated preempted frame fragments includes generating merge sublayer packets (m Packets).

12. The system of claim 10 wherein generating a plurality of simulated preempted frame fragments includes generating fragments of at least one simulated preempted frame, wherein the fragments include an initial fragment and one or more continuation fragments.

13. The system of claim 10 wherein inserting the last fragment generation timestamp in the last fragment of the simulated frame fragments includes inserting the last fragment generation timestamp in a last 64 bytes of the last fragment.

14. The system of claim 13 wherein the DUT reassembles the simulated preempted frame fragments into a reassembled frame and fragments the reassembled frame and wherein receiving the frame or frame fragments generated by the DUT includes receiving the fragments of the reassembled frame.

15. The system of claim 14 wherein the last fragment generation timestamp is received in a last fragment of the reassembled frame.

16. The system of claim 10 wherein the preempted frame delivery latency calculator receives a reassembled frame from the DUT and the last fragment generation timestamp is included in the reassembled frame.

17. The system of claim 10 wherein calculating the delivery latency of the simulated preempted frame includes computing the delivery latency by subtracting the last fragment generation timestamp from a time of receipt of the frame or frame fragment including the last fragment generation timestamp.

18. The system of claim 10 wherein the preempted frame delivery latency calculator calculates delivery latency for a plurality of different simulated preempted frames and outputs an indication of jitter in delivery latency of the simulated preempted frames based on the calculated latencies.

19. A non-transitory computer readable medium having stored thereon executable instructions that when executed by a processor of a computer control the computer to perform steps comprising:
 in a test tool:
  simulating frame preemption by generating a plurality of simulated preempted frame fragments of a simulated preempted frame and an express frame;
  inserting a last fragment generation timestamp in a last fragment of the simulated preempted frame fragments, wherein inserting the last fragment generation timestamp in a last fragment of the simulated preempted frame fragments includes inserting the last fragment generation timestamp in a portion of the last fragment that will remain in a last fragment of a refragmentation of the simulated preempted frame in the event that the simulated preempted frame is reassembled and refragmented;
  transmitting the simulated preempted frame fragments and the express frame to a device under test (DUT) and wherein the DUT generates a frame or frame fragments based on the simulated preempted frame fragments;
  receiving the frame or frame fragments generated by the DUT, wherein the frame or one of the frame fragments generated by the DUT includes the last fragment generation timestamp; and
  calculating, using the last fragment generation timestamp, delivery latency of the simulated preempted frame generated by the test tool.

20. The non-transitory computer readable medium of claim 19 wherein the steps further includes inserting the last fragment generation timestamp in the last fragment of the simulated frame fragments includes inserting the last fragment generation timestamp in a last 64 bytes of the last fragment.

* * * * *